United States Patent [19]

Bolliger

[11] 3,725,750

[45] Apr. 3, 1973

[54] SEMICONDUCTOR DISC HAVING TAPERED EDGE RECESS FILLED WITH INSULATION COMPOUND AND UPSTANDING CYLINDRICAL INSULATING RING EMBEDDED IN COMPOUND TO INCREASE AVALANCHE BREAKDOWN VOLTAGE

[75] Inventor: Andre Bolliger, Wettingen, Switzerland

[73] Assignee: Aktiengesellschaft Brown, Boveri & Cie,, Baden, Switzerland

[22] Filed: Feb. 15, 1972

[21] Appl. No.: 226,550

Related U.S. Application Data

[63] Continuation of Ser. No. 2,834, Jan. 14, 1970, abandoned.

[52] U.S. Cl. ........317/234 R, 317/234 E, 317/234 F, 317/234 T, 317/235 AB, 29/588

[51] Int. Cl. ........H03l 3/00

[58] Field of Search....317/234, 235, 3, 3.1, 30, 41.1; 174/52; 29/588

[56] References Cited

UNITED STATES PATENTS

| | | | |
|---|---|---|---|
| 2,807,558 | 9/1957 | Pankove | 317/235 |
| 3,209,279 | 9/1965 | Kambouris | 317/235 |
| 3,418,587 | 12/1968 | Riebman et al. | 317/235 |
| 3,448,351 | 6/1969 | Baertsch | 317/235 |
| 3,549,961 | 12/1970 | Gault | 317/235 |
| 3,559,006 | 1/1971 | Otsuka et al. | 317/235 |

*Primary Examiner*—John W. Huckert
*Assistant Examiner*—Andrew J. James
*Attorney*—Ralph E. Parker et al.

[57] ABSTRACT

A disc of semiconductor material includes a P-N transition extending transversely therethrough to a circumferentially extending recess located in a marginal edge portion. The recess is filled with an insulating compound and the end portion of a cylindrical insulating member projects into and is embedded in the insulating compound to increase the breakthrough voltage.

4 Claims, 2 Drawing Figures

INVENTOR.
André Bolliger
BY
Pierce, Scheffler & Parker
Attorneys

SEMICONDUCTOR DISC HAVING TAPERED EDGE RECESS FILLED WITH INSULATION COMPOUND AND UPSTANDING CYLINDRICAL INSULATING RING EMBEDDED IN COMPOUND TO INCREASE AVALANCHE BREAKDOWN VOLTAGE

This is a continuation of application Ser. No. 2834 filed Jan. 14, 1970 and now abandoned.

This invention relates to a semiconductor element and is more specifically concerned with one having a semiconductive layer and containing a P-N transition, the element being required to withstand in use a relatively high voltage in the blocking or cut-off direction.

It has been proposed to provide one face of the layer in such an element with a peripherally extending recess covered or filled with an insulation compound. The purpose of the filled or covered recess is to reduce the strength of the maximum surface field sufficiently to ensure that breakdown of the layer, when subjected to a relatively high blocking voltage, occurs through exceeding a critical field strength within the space charge zone of the layer rather than at the edge of the layer.

An object of this invention is the provision of an improved semiconductor element.

In accordance with the present invention there is provided a semiconductor element having a semiconductive layer containing a P-N transition and having the marginal edge-portion of one face of the layer formed with a recess containing an insulation compound in which is embedded one end-rim of an insulating member which projects away from the face.

Preferably the layer is a disc and the member is cylindrical.

The invention is based on the discovery that with semiconductor elements with very high lavine breakthrough voltages, e.g., 5,000 volts, during operation in the zone of the lavine breakthrough kink of the semiconductor curve and at a current of about 10 –20mA, flashovers occur, in many cases after a few minutes, across the insulation compound covering the recess of the semiconductive layer and these flashovers can adversely affect and even destroy the semiconductor element. The insulating member embedded in the insulation compound provides a barrier of high insulative strength projecting from the compound and which effectively stops such flashovers occurring.

Figure 1:
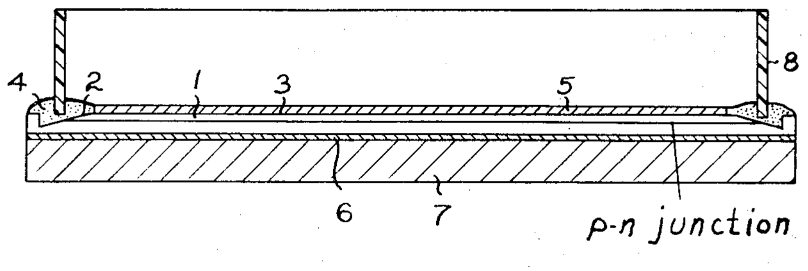

The invention will now be described in more detail, by way of example, with reference to the accompanying drawings, FIG. 1 of which shows diagrammatically in cross-section an active part of a semiconductor diode and FIG. 2 *a* fragmentary section illustrating a modified detail.

A silicon disc 1 with a diameter of 27 mm and a thickness of 800 $\mu$m has a P-N transition, which terminates at the surface of the disc on an annular conical chamfer 2 of the semiconductor disc 1. This conical chamfer 2 forms the inner flank of an annular recess provided in the marginal edge of an anode — side end face 3 of the disc. The recess is filled by an insulation compound 4 of silicon rubber. The silicon disc 1 is contacted, in the customary manner, on the anode side by alloying a gold-antimony foil 5, whilst it is soldered on the cathode side by means of an aluminum foil 6 to a 2mm thick carrier plate 7 of molybdenum.

In order to increase the breakthrough voltage, a cylindrical ring member 8 of polytetrafluoroethylene is anchored with one end edge portion embedded in the silicon rubber compound. In order to effect this anchoring, first a relatively thin layer of the highly viscous silicon rubber is applied to the base of the annular recess by means of a suitable device, for example, an injection syringe. The insulating member 8 is then placed on this layer of silicon rubber and further silicon rubber is added on the inside and outside of the end of the ring so that the insulating member 8 projects to a depth of about 1 mm into the silicon rubber compound 4.

After the silicon rubber has set, the finished active part is provided with electrical connections (not shown) and enclosed within a gas-tight housing containing a dry nitrogen atmosphere.

A semiconductor diode made as described above may be operated for long periods in the zone of the breakthrough kink at a blocking voltage of about 5,000 volts, a current of 10–20 mA and a temperature of 150° without a voltage flashover occurring at the edge of the active semiconductor part, that is to say in the region of the recess. The insulating member 8 preferably has fine grooves to a depth of 0.2 mm formed at least in its outer cylindrical surface where it is embedded, in order to improve its anchorage in the silicon rubber compound.

In an alternative embodiment the insulating member 8 consists of ceramic material.

Figure 2:
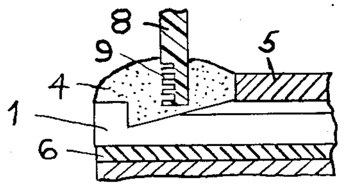

In order to improve the anchorage of the end portion of the insulating member in the insulating compound, the outer surface of the insulating member which projects into the compound can be provided with peripheral grooves 9 as shown in the enlarged fragmentary view of FIG. 2. If desired, the inner surface of the insulating member may also be provided with such grooves.

I claim:

1. A semiconductor structure comprising a circular disc of semiconductor material having a P-N junction therein, a circular recess formed in the marginal edge portion of said circular disc in, one face thereof and extending to said P-N junction, said recess being filled with an insulation compound, and a tubular insulating member projecting beyond said face in a direction substantially transverse with respect to said face, said insulating member having upper and lower end portions thereof, said lower end portion being embedded in said insulating compound, said tubular insulating member thereby forming an insulating barrier serving to increase the avalanche breakdown voltage of said semiconductor disc.

2. A semiconductor structure as defined in claim 1 wherein said tubular insulating member is made from polytetrafluoroethylene.

3. A semiconductor structure as defined in claim 1 wherein said tubular insulating member is made from a ceramic material.

4. A semiconductor structure as defined in claim 1 wherein the lower embedded end portion of said tubular insulating member is provided with grooves to improve its anchorage in said insulating compound.

* * * * *